(No Model.)  3 Sheets—Sheet 1.

T. P. COOMBS.
LEATHER DRESSING MACHINE.

No. 599,928.  Patented Mar. 1, 1898.

WITNESSES.
Matthew M. Blunt.
J. Murphy.

INVENTOR.
Thomas P. Coombs
by Jas. H. Churchill
ATT'Y.

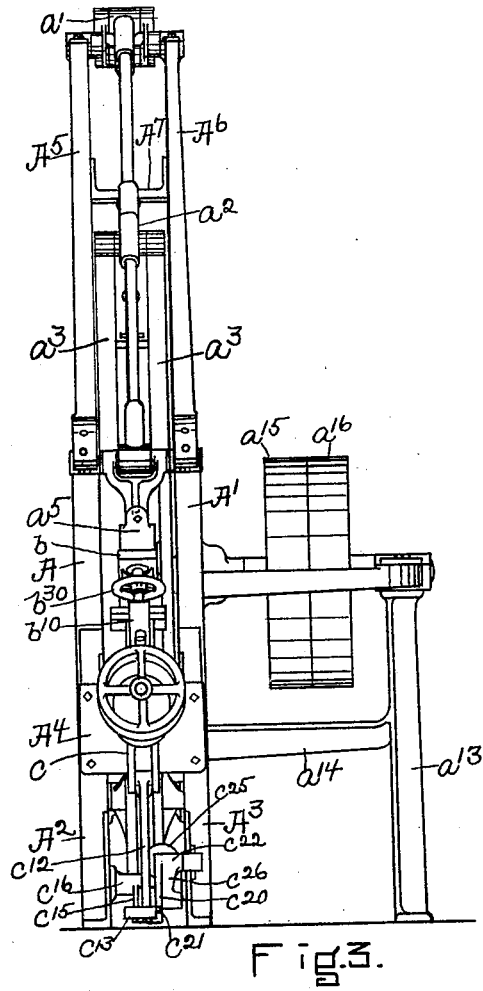

(No Model.) 3 Sheets—Sheet 3.

T. P. COOMBS.
LEATHER DRESSING MACHINE.

No. 599,928. Patented Mar. 1, 1898.

WITNESSES.
Matthew M. Blunt
J. Murphy

INVENTOR.
Thomas P. Coombs
by Jas. H. Churchill
ATT'Y.

UNITED STATES PATENT OFFICE.

THOMAS P. COOMBS, OF PEABODY, MASSACHUSETTS, ASSIGNOR TO THE VAUGHN MACHINE COMPANY, OF PORTLAND, MAINE.

LEATHER-DRESSING MACHINE.

SPECIFICATION forming part of Letters Patent No. 599,928, dated March 1, 1898.

Application filed July 13, 1897. Serial No. 644,392. (No model.)

*To all whom it may concern:*

Be it known that I, THOMAS P. COOMBS, residing at Peabody, in the county of Essex and State of Massachusetts, have invented an Improvement in Leather-Dressing Machines, of which the following description, in connection with the accompanying drawings, is a specification, like letters and numerals on the drawings representing like parts.

This invention relates to a machine for dressing leather and is herein shown as embodied in a machine of the class shown and described in United States Patent No. 437,483, granted to me September 30, 1890.

In accordance with this invention the machine is provided with a bed or support for the leather which is movable into and out of its operative position and is automatically locked in its operative position, but is adapted to be released from its operative position substantially in an instant to avoid injury to the bolster covering the bed and to the operating-tool, as will be described. The machine is further provided with a novel supporting mechanism for the bed, whereby simplicity and efficiency are obtained. These and other features of this invention will be pointed out in the claims at the end of this specification.

Figures 1, 2:
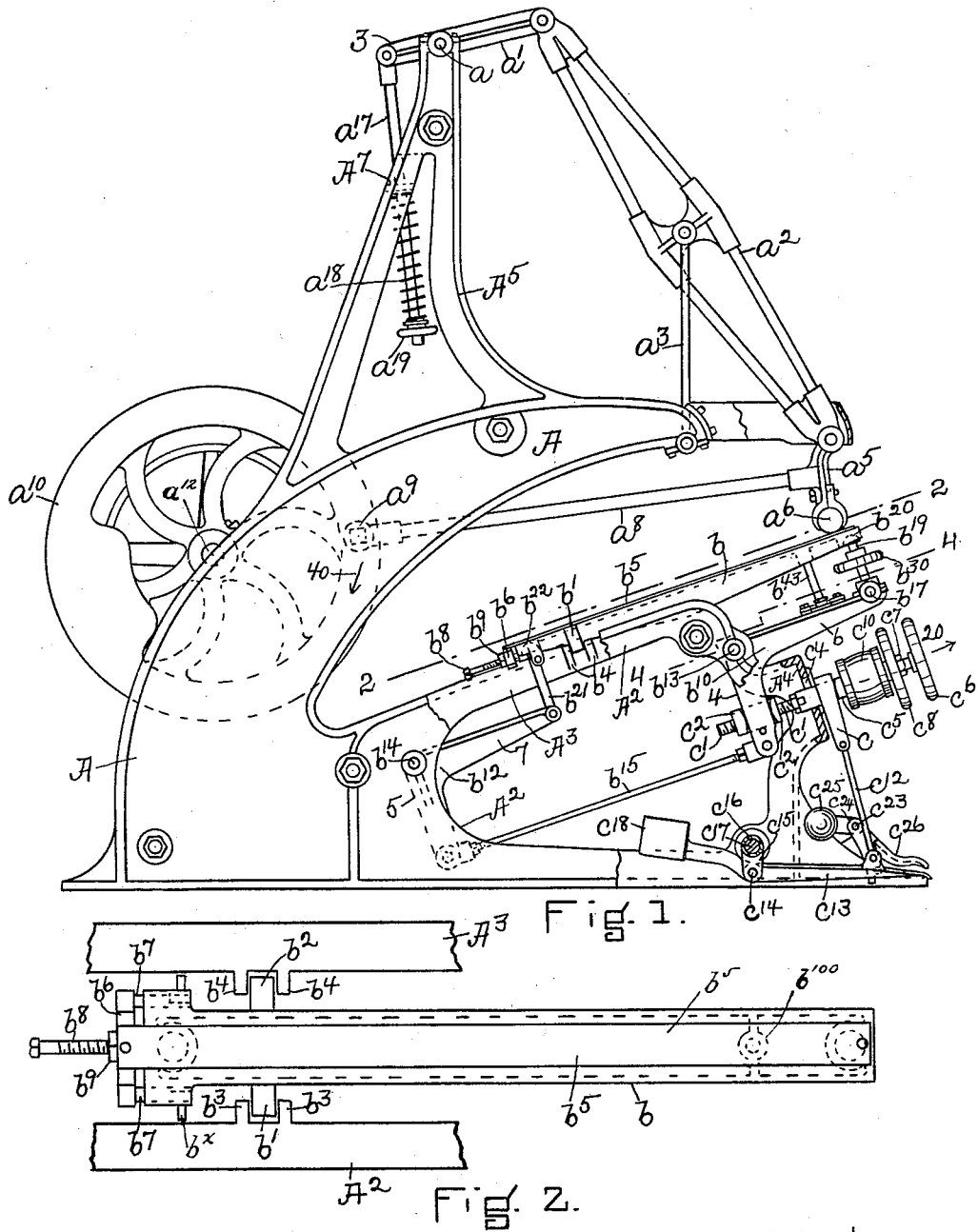
Figure 8:
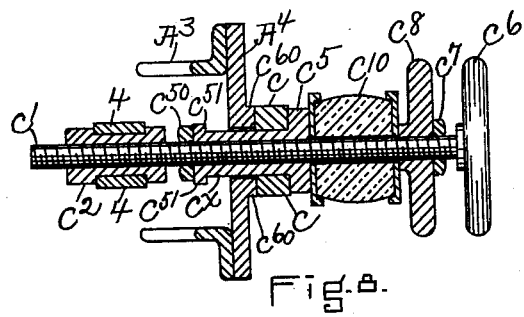
Figure 9:
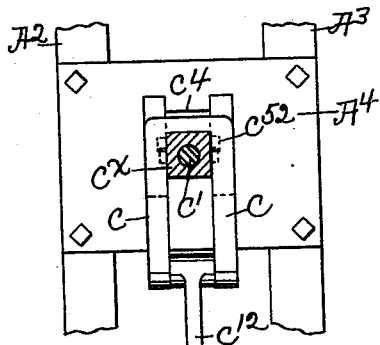

Figure 1 is a side elevation, with parts broken away, of a leather-dressing machine embodying this invention; Fig. 2, a detail in plan view looking down from the line 2 2, Fig. 1; Fig. 3, a front elevation of the machine shown in Fig. 1 looking toward the left; Fig. 4, a sectional detail on the line 4 4, Fig. 1, to be referred to; Figs. 5 and 6, details of the automatic locking device for the bed, to be referred to; and Figs. 7 to 9, inclusive, details on an enlarged scale, to be referred to.

The operating parts of the machine herein shown as embodying this invention are supported by a suitable framework, which comprises, in the present instance, two uprights A A', having secured to or forming part of them arms $A^2$ $A^3$, suitably connected together at their front ends, as by a cross plate or bar $A^4$.

The uprights A A', as herein shown, are extended forward over the arms $A^2$ $A^3$ and have erected upon them substantially vertical standards or arms $A^5$ $A^6$, connected by a cross-bar $A^7$. The standards or arms $A^5$ $A^6$ support in suitable bearings the pivot $a$ of a lever $a'$, having pivotally secured to its front arm a lever or link $a^2$, joined by connecting rods or links $a^3$ to the front end of the uprights A A', and the lever $a^2$ has pivotally connected to its lower end a carrier $a^5$ for a tool $a^6$, which latter may and preferably will be a cylinder or roll of glass. The tool-carrier $a^5$ is connected by a link or rod $a^8$ to an eccentric-pin $a^9$ on a disk or wheel $a^{10}$, fast on the driving-shaft $a^{12}$, suitably supported in the uprights A A' and in an auxiliary upright or standard $a^{13}$, having arms $a^{14}$, attached to the upright A', the shaft $a^{12}$ being provided, as shown, with fast and loose pulleys $a^{15}$ $a^{16}$. The lever $a'$ has pivotally connected to its short arm 3 a rod $a^{17}$, which is extended through the cross-bar $A^7$ and below said cross-bar is encircled by a spiral spring $a^{18}$, which bears against the under side of the said cross-bar and an adjusting-nut $a^{19}$ on the lower end of said rod. The tension of the spring $a^{18}$ may be adjusted by the nut $a^{19}$ to regulate the pressure of the operating tool or cylinder $a^6$ upon the leather or other work. The leather or other work is supported upon a bed $b$, which may be of substantially the same construction as shown in the patent referred to, but which in accordance with this invention is normally out of its operative position, but is adapted to be moved into and removed from its operative position substantially in an instant, as will be described.

The bed $b$, which is substantially long and narrow, as herein shown, is provided with laterally-projecting arms or lugs $b'$ $b^2$, (see Fig. 2,) which extend into guideways formed by lugs or ears $b^3$ $b^4$ on the inner side of the arms $A^2$ $A^3$, and the said bed is also preferably provided with a bolster $b^5$, of leather or other suitable material, which is secured at one end to the bed and at its other end is secured to a cross head or bar $b^6$, movable with relation to the bed in the direction of the length thereof to practically form an extension of the same. The cross-head $b^6$ is provided, as herein shown, (see Fig. 2,) with pins or arms $b^7$, which extend into suitable sockets in the end of the bed, and the said cross-head may be moved away from the bed by means of an adjusting-screw $b^8$ to take up any stretch in the bolster, and the said bed may be locked in its adjusted position by a nut $b^9$. The bed is provided, as shown in Fig. 2, with lugs or pins $b^\times$, preferably adjustable and which serve to assist in centering the bed between the side arms $A^2$ $A^3$. The bed $b$ is supported in the present instance by levers $b^{10}$ $b^{12}$, shown as bell-crank levers pivoted at $b^{13}$ $b^{14}$ in the arms $A^2$ $A^3$ of the frame and having their depending arms 4 5 connected together by a link or rod $b^{15}$, pivotally attached to said arms, and having their arms 6 7 substantially parallel to the downwardly-inclined bed $b$ and connected thereto, as will now be described. The arm 6 of the lever $b^{10}$ is slotted or forked at its front end (see Fig. 4) for the reception of a pivot pin or shaft $b^{17}$, provided with a boss $b^{18}$, having a threaded socket, into which extends the threaded end of a rod $b^{19}$, provided at its upper end with a rounded head $b^{20}$, (see dotted lines, Figs. 1 and 7,) which fits into a socket in the under side of the bed to form practically a ball-and-socket joint, and the bed is supported at its rear end in a similar manner by means of a rod $b^{21}$, pivoted to the arm 7 of the lever $b^{12}$ and provided at its upper end with a rounded head $b^{22}$ (see dotted lines, Fig. 1) to enter a socket in the under side of the bed. This manner of supporting the bed $b$ enables the latter to be finely adjusted, so as to tip or incline the bed, as desired, for by turning the screw-rod $b^{19}$ by means of a hand-wheel $b^{30}$ thereon the outer end of the bed may be raised and lowered. Furthermore, the bed $b$ may be adjusted laterally, so that it may incline sidewise either to the right or left and thereby enable the bed to be adjusted to the tool or cylinder $a^6$ and thereby compensate for any variation in the diameter of the said cylinder.

Figure 7:
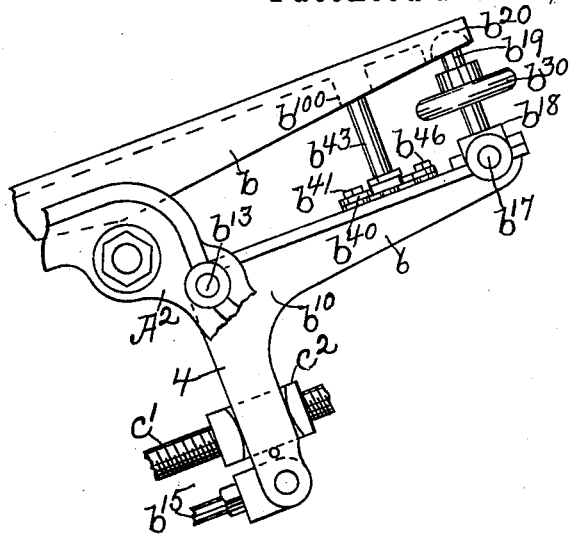

In practice it frequently happens that the rolls or cylinders $a^6$ taper more or less, and by means of the lateral adjustment of the bed the latter may be positioned so that the cylinder will bear upon the leather throughout its entire length. This lateral adjustment of the bed may be effected by means of a lever $b^{40}$, (see Fig. 4,) pivoted at $b^{41}$ to the arm 6 of the lever $b^{10}$ and provided with an elongated or what may be termed an "eccentric" slot $b^{42}$, into which extends the lower end of a pin or rod $b^{43}$, attached to the under side of the bed $b$, as shown in Figs. 1 and 7, the said rod or pin being preferably screwed into a threaded socket in a rib $b^{100}$ (see Figs. 2 and 7) on the under side of the said bed. The lever $b^{40}$ may be provided with a handle $b^{44}$, by which the said lever may be turned on its pivot, so as to carry the lower end of the rod $b^{43}$ either to the right or left of a central line through the pivot $b^{41}$ and parallel to a line in the direction of the length of the bed, and thereby tip the bed to the right or left on the heads $b^{20}$ $b^{22}$, according to which way it is desired to incline the bed to conform to the roll or cylinder $a^6$.

The lever $b^{10}$ may be designated the "laterally-adjusting" lever for the bed and may be secured in its adjusted position, as herein shown, by means of a clamping bolt or screw $b^{46}$, extended through a slot $b^{47}$ in the lever $b^{40}$ and into the arm 6 of the lever $b^{10}$.

The bed $b$ may be raised and lowered by turning the supporting-levers $b^{10}$ $b^{12}$ on their pivots, and this movement of the said levers is effected by means of a cam or wedge $c$, (see Figs. 1, 8, and 9,) fitted over a sleeve $c^\times$ on a threaded rod $c'$, adjustably secured to the arm 4 of the lever $b^{10}$, as herein shown, by a nut $c^2$, which is straddled by the arm 4, the said rod and sleeve $c^\times$ being extended through a slot $c^4$ in the cross plate or bar $A^4$ and the said sleeve being provided beyond said cross-plate with a collar $c^5$, having a cam-shaped or inclined face with which coöperates the cam-shaped or inclined face of the wedge or cam $c$. The rod $c'$ is further provided, as herein shown, with a hand-wheel $c^6$ and with a nut $c^7$ and a hand-wheel $c^8$, which is adapted to be turned to regulate the tension of a rubber or other buffer $c^{10}$, bearing against the collar $c^5$.

The sleeve $c^\times$ is locked on the rod $c'$ against movement in one direction by the nut $c^{50}$ (see Fig. 8) and in the other direction by lugs $c^{51}$, which coöperate with the back of the plate $A^4$, which is provided with suitable slots $c^{52}$ (see Fig. 9) in the side walls of the slot $c^4$, through which the lugs $c^{51}$ may pass and then drop below the said slots. The plate $A^4$ is provided on its front face at the sides of the slot $c^4$ with ribs $c^{60}$, which may be planed off to secure a smooth bearing for the back face of the wedge $c$.

The cam $c$ is connected, as herein shown, by a link or rod $c^{12}$ to a foot-treadle $c^{13}$, pivoted at $c^{14}$ in a depending crank or arm $c^{15}$ of a sleeve $c^{16}$, mounted on a shaft or pin $c^{17}$, supported by the arms $A^2$ $A^3$ of the framework, the lever $c^{13}$ being provided, as shown, with a weight $c^{18}$. The foot-treadle $c^{13}$ is depressed to move the cam or wedge $c$ down and thereby move the rod $c'$ in the direction of the arrow 20, Fig. 1, so as to turn the bell-crank levers $b^{10}$ $b^{12}$ on their pivots and elevate the table $b$ into its operative position, and in accordance with this invention the table is locked in its elevated position by means of a locking device coöperating with the foot-treadle $c^{13}$, as will be described.

The locking device referred to consists, as herein shown, of an arm $c^{20}$, (see Fig. 5,) provided with a notch $c^{70}$ (see Fig. 5) at its lower end, which is adapted to engage a pin or projection $c^{21}$ on the treadle $c^{13}$ when the latter has been moved into its depressed or operative position. The notched arm $c^{20}$ is secured to or forms part of a sleeve or hub $c^{22}$, mounted loosely upon a stud or pin $c^{23}$, supported in the framework of the machine and provided with a rearwardly-extended crank or arm $c^{24}$, having secured to or forming part of it a weight $c^{25}$, the said sleeve also being provided, as shown, with a downwardly-extended crank or arm $c^{26}$, forming a foot-treadle for the locking device. The weight $c^{25}$ acts to keep the notched arm $c^{20}$ in engagement with the pin or projection $c^{21}$, and the notched arm $c^{20}$ is adapted to be released from engagement with the pin or projection $c^{21}$ by the operator depressing the treadle $c^{26}$, and as the treadle $c^{26}$ is depressed the notched arm $c^{20}$ is moved backward, thereby depressing the lever $c^{13}$ until the notch in the arm $c^{20}$ has cleared the pin or projection $c^{21}$, and when the arm $c^{20}$ is disengaged from the pin $c^{21}$ the weight $c^{18}$ on the foot-treadle $c^{13}$ turns the latter on its pivot and moves the cam or wedge $c$ upward, thereby permitting the table $b$ to drop or descend from its operative position by gravity. When the foot-treadle $c^{13}$ is elevated by its weight $c^{18}$, the locking-pin $c^{21}$ rests in engagement against the front face of the notched arm $c^{20}$, which is maintained in contact with the pin $c^{21}$ by the weight $c^{25}$, and as a result the locking device or arm $c^{20}$ is in operative condition at all times to engage the pin $c^{21}$ when the treadle $c^{13}$ is depressed sufficiently far to engage the said pin with the notch in the arm $c^{20}$.

When the bed is in its lowered position, the wedge $c$ is elevated by the weight $c^{18}$, attached to the foot-treadle, and the arm $c^{20}$ is swung forward by its weight $c^{25}$, so that its front face above the locking-notch $c^{70}$ is kept in contact with the pin $c^{21}$. When the foot-treadle is depressed, the wedge $c$ is drawn down and, acting on the wedge-block $c^5$, turns the levers $b^{10}$ $b^{12}$, so as to elevate the bed into its operative position, and at or about the time the bed is thus elevated the pin $c^{21}$ will have passed below or in line with the notch $c^{70}$ in the arm $c^{20}$, and the latter will be automatically moved forward by its weight $c^{25}$, so as to engage said notch with the pin, as shown in Fig. 5, and thus automatically lock the bed in its operative position, so that the operator is free to remove his foot from the foot-treadle and can change his position without regard to the bed, which remains elevated until it is released by the operator pressing down upon the lever or arm $c^{26}$ with his foot, whereupon the locking-arm $c^{20}$ is swung back and disengaged from the pin $c^{21}$, thereby leaving the bed free to drop by gravity, as herein shown.

It will be seen that the table $b$ is automatically locked in its operative position and is capable of being released from its locked position substantially in an instant, so that it may be dropped down or removed from the path of movement of the operating tool or roll $a^6$ substantially in an instant, which is very useful in practice, as it prevents the bolster $b^5$ from being roughened, burned, or otherwise injuriously acted upon by the operating-tool when the leather or other material is withdrawn between the bolster and the operating-tool.

In practice the operating-tool $a^6$ is carried down in contact with the leather to be glazed, polished, or otherwise treated, as the eccentric-pin $a^9$ travels in the direction indicated by the arrow 40 for one-half the revolution of the fly-wheel $a^{10}$, and on the other half of the revolution of the said wheel the tool is carried up out of contact with the leather and into the position shown in Fig. 1.

I claim—

1. In a machine of the class described, the combination of the following instrumentalities, viz: an operating-tool, a bed to support the material to be acted upon movable bodily into and out of its operative position with relation to the said tool, mechanism to simultaneously elevate the opposite ends of the bed and move it into its operative position, and an automatic locking device to engage the bed-elevating mechanism and lock the said bed in its operative position, and a releasing device to automatically unlock said locking device, substantially as described.

2. In a machine of the class described, the combination of the following instrumentalities, viz: an operating-tool, a bed to support the material acted upon, pivotal supports for the said bed near its opposite end to permit the said bed to be inclined sidewise, means independent of said pivotal supports to turn the bed on said pivotal supports, and means to lock the bed in its adjusted position, substantially as described.

3. In a machine of the class described, the combination of the following instrumentalities, viz: an operating-tool, a bed to support the material to be acted upon movable into and out of its operative position, a bed-supporting mechanism, a foot-treadle connected to said supporting mechanism to elevate said bed, an automatic locking device for said treadle to lock the bed in its elevated position, and a foot-treadle for the automatic locking device, substantially as described.

4. In a machine of the class described, the combination of the following instrumentalities, viz: a vertically-movable bed, a supporting mechanism therefor, a foot-treadle connected to said supporting mechanism to effect the elevation of said bed, and an automatic locking device for said foot-treadle, substantially as described.

5. In a machine of the class described, the combination of the following instrumentalities, viz: a vertically-movable bed, a treadle or lever, intermediate mechanism operated by said treadle or lever to elevate said bed into its operative position, and an automatic locking device for said treadle or lever adapted to be operated to release said treadle or lever and permit the bed to be lowered substantially in an instant, substantially as described.

6. In a machine of the class described, the combination of the following instrumentalities, viz: a vertically-movable bed, a treadle or lever to elevate the same into its operative position, and an automatic locking device coöperating with said treadle to automatically lock said bed in its operative position, and means connected to said locking device to effect the release of the said locking device, substantially as described.

7. In a machine of the class described, the combination of the following instrumentalities, viz: a vertically-movable bed, levers to support said bed, means to connect said levers together, and a sliding wedge or cam to effect movement of said levers to elevate the bed, substantially as described.

8. In a machine of the class described, the combination of the following instrumentalities, viz: a vertically-movable bed, angle-levers, means to pivotally support said bed on said levers, a link connecting said levers together, a rod $c'$ connected to one of said levers, a cam on said rod, and a cam or wedge coöperating with the cam on the rod $c'$, substantially as described.

In testimony whereof I have signed my name to this specification in the presence of two subscribing witnesses.

THOMAS P. COOMBS.

Witnesses:
LAWRENCE PURTELL,
H. A. NEWCOMB.